United States Patent [19]

Chaplin

[11] Patent Number: 5,338,791
[45] Date of Patent: Aug. 16, 1994

[54] FIRE-RETARDANT COMPOSITIONS

[75] Inventor: Dominic Chaplin, Berkshire, United Kingdom

[73] Assignee: Alcan International Limited, Montreal, Canada

[21] Appl. No.: 969,831

[22] PCT Filed: Jul. 29, 1991

[86] PCT No.: PCT/GB91/01280
§ 371 Date: Jan. 27, 1993
§ 102(e) Date: Jan. 27, 1993

[87] PCT Pub. No.: WO92/02578
PCT Pub. Date: Feb. 20, 1992

[30] Foreign Application Priority Data

Jul. 27, 1990 [GB] United Kingdom ............... 9016555

[51] Int. Cl.⁵ ............................................. C08K 3/38
[52] U.S. Cl. ............................ 524/401; 524/405
[58] Field of Search ............................ 524/401, 405

[56] References Cited

U.S. PATENT DOCUMENTS

| | | | |
|---|---|---|---|
| 3,985,706 | 10/1976 | Kay | 524/405 |
| 4,022,880 | 5/1977 | Vinson | 424/49 |
| 4,105,621 | 8/1978 | Maslen et al. | 524/606 |
| 4,360,616 | 11/1982 | Papilagan | 524/100 |
| 4,439,572 | 3/1984 | Kindrick | 524/405 |
| 4,525,424 | 6/1985 | Church | 428/428 |
| 4,552,912 | 11/1985 | Williams | 524/405 |
| 5,071,894 | 12/1991 | Weil et al. | 524/405 |

FOREIGN PATENT DOCUMENTS 57-76042  5/1982  Japan .

Primary Examiner—Kriellion S. Morgan
Attorney, Agent, or Firm—Watts Hoffmann Fisher & Heinke

[57] ABSTRACT

This invention relates to fire-retardant polymer compositions, and preferably, but not exclusively, to fire-retardant polyamide compositions.

It has now been found that the combination of a zinc borate and a divalent metal stannate, particularly zinc stannate, in halogen-containing polymeric compositions provides an increased fire-retardant effect, which is greater than that expected from the use of either zinc borate or the stannate alone. The combination also suppresses smoke production. Preferably the stannate is zinc stannate.

8 Claims, No Drawings

FIRE-RETARDANT COMPOSITIONS

This invention relates to fire-retardant polymer compositions, and preferably, but not exclusively, to fire-retardant polyamide compositions. It will be understood by those in the art that the term "fire-retardant" encompasses "flame-retardant".

The use of zinc borate or zinc stannate as components of fire-retardant compositions is well known in the art. The use of zinc borate is described in U.S. Pat. No. 4,360,616 and U.S. Pat. No. 4,504,611.

U.S. Pat. No. 4,360,616 describes a glass-reinforced flame-retardant polyamide composition having good arc tracking resistance and consisting of:
a) 40–65 weight percent of a polyamide of film-forming molecular weight,
b) 16–35 weight percent of melamine, melam, melamine cyanurate or a melamine derivative.
c) 1–7 weight percent selected from the group consisting of a chlorinated compound obtained from the condensation of two moles of perchloro-cyclopentadiene and one mole of 1,5-cyclooctadiene, or a brominated polystyrene,
d) 1–4.9 weight percent of zinc borate or zinc oxide, and
e) 5–30 weight percent of glass fibres.

U.S. Pat. No. 4,504,611 similarly describes a flame-retardant polyamide consisting, in percent by weight, of:
a) 35–76% polyamide,
b) 6–10% zinc borate,
c) 10–15% melamine cyanurate,
d) 0–35% fibreglass,
e) 0–3% antimony trioxide, and
f) 8–15% of a chlorinated compound.

Although there is disclosure of the use of a zinc borate with zinc oxide, there is no reference in this prior art to the use of zinc stannate.

It has now been found that the combination of a zinc borate and a divalent metal stannate, particularly zinc stannate, in halogen-containing polymeric compositions provides an increased fire-retardant effect, which is greater than that expected from the use of either zinc borate or the stannate alone. The combination also suppresses smoke production. Where the term "stannate" is used herein in a general sense it includes "hydroxy stannate" in view of their similar fire-retardant properties.

According to the present invention, there is provided a fire-retardant polymer composition comprising a polymer and a fire-retardant amount of a mixture of a zinc borate and a divalent metal stannate, wherein the composition includes a source of halogen.

The source of halogen can be the polymer itself or can be a separate component, such as an organic halogen-containing fire-retardant, provided that the component is compatible with the polymer.

Preferably the fire-retardant compositions of the present invention comprise, by weight percent:
(a) 40–94% polyamide,
(b) 5–40% halogen-containing organic fire retardant,
(c) 1–20% of a mixture of zinc borate and a divalent metal stannate, preferably in a weight percentage ratio of between 10:90 and 90:10, more preferably of the order of 50:50.

Examples of suitable stannates that can be used are zinc stannate, zinc hydroxystannate, calcium hydroxystannate and magnesium hydroxystannate. Preferably the stannate is zinc stannate.

The constitution of zinc borate is variable as is described in the paper entitled "Applications of zinc borate in polymer blends and alloys" by W. J. Kennelly in the report of the Proceedings of the Fire Retardant Chemicals Association meeting held at Hilton Head Island, S.C., Mar. 17th to 20th 1991 pages 199 to 205.

Whilst any zinc borate can be used, that of the formula $2ZnO_2 \cdot 3B_2O_3 \cdot 3.5H_2O$—known as "ZB 2335"—is preferred and is the borate that is intended in this specification unless indicated to the contrary.

Examples of suitable polymers include polyesters, epoxy resins, ABS combinations and the like, but preferably, a polyamide is used. Halogenated polymers such as PVC can also be used in this invention and since they act as a source of halogen no separate halogen-containing component is needed.

Polyamides are thermoplastic compounds, constructed of the bifunctional monomers, dicarboxylic acid and diamine, the properties of which are related to the length of the hydrocarbon radicals. One general class of polyamides used in the present invention is "nylon".

One example of nylon is polyhexamethylene adipamide (Nylon 66) formed by condensing hexamethylene diamine and adipic acid. Other examples include polyhexamethylene azelaamide (Nylon 69), polyhexamethylene sebacamide (Nylon 610), polylauric lactam, polycaprolactam (Nylon 6), poly-11-aminoundecanoic acid and poly-bis-(4-aminocyclohexyl) methane dodecanoamide.

The organic halogen-containing fire-retardant used can be any of those known in the art, such as those described in U.S. Pat. No. 4,360,616 and U.S. Pat. No. 4,504,611, particularly that sold under the trade mark Dechlorane. Other examples include poly-dibromophenylene oxide, decabromo-diphenyl oxide and octabromo-diphenyl oxide.

A zinc borate and a divalent metal stannate added together, preferably in a weight ratio of 50:50, to the composition results in an unexpected synergistic fire-retardant effect, i.e. increase in the fire-retardant properties of the compositions beyond that expected.

The inclusion of both a zinc borate and a divalent metal stannate in the fire-retardant composition also has the result that antimony compounds are not required. This is extremely useful as these compounds are expensive, relatively hazardous and promote smoke when burning.

One or more conventional fire-retardants such as zinc oxide and tin oxide can be used in addition to the combination of a zinc borate and a divalent metal stannate, if desired.

The composition may also include other known additives such as glass fibre, calcium carbonate, talc or clay.

The present invention will now be described by way of the following Examples.

EXAMPLE 1

In order to test the fire-retardant characteristics of the present invention, the following tests were performed on sample test strips.

A UL94 test developed by the U.S. Underwriters Laboratory involves the use of a test strip 12 mm wide. The thickness of the strip can vary but is stated in each test.

The strip is held vertically and the flame of a Bunsen burner applied for 10 seconds before being removed. After the strip is extinguished the Bunsen flame is applied for a further 10 seconds and then removed. The total burning time after the two applications is measured.

The whole procedure is then repeated for verification.

Results from the various tests are then evaluated and classified as either V-0 (the best), V-1, V-2 or fail. For thermoplastics a V-0 pass for a 1.5 mm strip thickness is considered to be a good pass.

The second test used in evaluating the fire-retardant properties of the compositions is the COI test. This involves limiting the oxygen concentration in an oxygen/nitrogen mixture to that which will just sustain combustion. The test strip is here again held vertically and the flame applied to the top of the strip.

A number of test strips were prepared according to normal practice form Nylon 66 using three different loadings of fire-retardant. The chlorine-containing fire-retardant Declorane was also present. The compositions of the three formulations are set out in Table 1 and are expressed as weight percentages of the total composition. Three thicknesses of test strip were used, namely 3, 1.5 and 0.75 mm, and the fire-retardant used was also varied so that zinc borate alone, zinc stannate alone and the combination of both zinc borate and zinc stannate were tested.

The results of the UL94 and COI tests on the test strips are set out in Tables 2, 3 and 4.

From the Tables it can be seen that when zinc borate and zinc stannate are used together in a weight ratio of 50:50 the fire-retardant properties are synergistically increased.

For Formulation 1 with a fire retardant loading of 10% by weight, zinc borate alone gave a value of V-0 in the UL94 test for the 3 mm and 1.5 mm thickness specimens. The thinnest specimen, however, gave a value of V-1. Zinc stannate alone on the other hand gave a value of V-0 for all three thicknesses. The combination of zinc borate and zinc stannate also gave a value of V-0 for all three thicknesses.

The results for Formulation 2—a 7.5% by weight fire-retardant loading—again show a trend to an unexpected increase in fire-retardant properties using the combination of the two zinc compounds.

Formulation 3 with a 5% by weight fire retardant loading again showed an increased effect with the combination of zinc borate and zinc stannate. Zinc stannate alone gave a value of V-1 for all three test thicknesses and in combination with zinc borate also gave a value of V-0 for all three samples.

EXAMPLE 2

A series of six samples based on polyvinylchloride were prepared having the basic composition as set out in Table 5 and including a total of 10 phr of zinc fire-retardant but in which the relative amounts of zinc borate and zinc stannate were varied between 0 and 100%.

Each sample was flame tested and the COI amounts of smoke and carbon monoxide (CO) measured. The smoke test followed BS 6401:1983 using wire mesh-supported 0.8 mm specimens, whilst the CO concentration was measured after 2 minutes after insertion of the sample into the flame test.

The results are presented in Table 6 and show that better fire-retardant properties were obtained from the samples containing both zinc borate and zinc stannate than would have been expected for the relative proportion used.

As well as resulting in a synergistic fire-retardant effect the present invention also allows for the use of a decreased amount of zinc borate and zinc stannate relative to the amount used when either component is used on its own.

It should also be noted that antimony trioxide is not required in the present invention, thus eliminating potential toxic waste posed by the use of this compound.

TABLE 1

| | Weight % | | |
|---|---|---|---|
| | Formulation 1 | Formulation 2 | Formulation 3 |
| Nylon 66 | 70 | 77.5 | 85 |
| Dechlorane | 20 | 15 | 10 |
| Zinc Fire Retardant | 10 | 7.5 | 5 |
| Total | 100 | 100 | 100 |

TABLE 2

ZINC FIRE RETARDANT (Formulation 1)

| TEST | ZINC BORATE | ZINC STANNATE | ZINC BORATE/ ZINC STANNATE 50/50 |
|---|---|---|---|
| UL-94 3 mm | V-0 | V-0 | V-0 |
| UL-94 1.5 mm | V-0 | V-0 | V-0 |
| UL-94 0.75 mm | V-1 | V-0 | V-0 |
| COI | 30 | 32 | 29 |

TABLE 3

ZINC FIRE RETARDANT (Formulation 2)

| TEST | ZINC BORATE | ZINC STANNATE | ZINC BORATE/ ZINC STANNATE 50/50 |
|---|---|---|---|
| UL-94 3 mm | V-0 | V-0 | V-0 |
| UL-94 1.5 mm | V-1 | V-0 | V-0 |
| UL-94 0.75 mm | V-1 | V-0 | V-1 |
| COI | 29 | 31 | 30 |

TABLE 4

ZINC FIRE RETARDANT (Formulation 3)

| TEST | ZINC BORATE | ZINC STANNATE | ZINC BORATE/ ZINC STANNATE 50/50 |
|---|---|---|---|
| UL-94 3 mm | V-2 | V-1 | V-1 |
| UL-94 1.5 mm | V-2 | V-1 | V-1 |
| UL-94 0.75 mm | V-2 | V-1 | V-1 |
| COI | 28 | 29 | 28 |

TABLE 5

| Amount (phr) | Component | Product Name | Manufacturer |
|---|---|---|---|
| 100 | PVC | VY 110/51 | Hydro Polymers |
| 50 | DOP | Reomol | Ciba Geigy |
| 4 | Stabiliser | Irgastab BC26 | Ciba Geigy |
| 0.7 | Wax | Irgawax 371 | Ciba Geigy |

TABLE 6

| Sample | Amount of Zinc borate (phr) | Amount of Zinc stannate (phr) | COI | Smoke ($D_m$) | CO (ppm) |
|---|---|---|---|---|---|
| 1 | 10 | — | 24.7 | 386 | 548 |

TABLE 6-continued

| Sample | Amount of Zinc borate (phr) | Amount of Zinc stannate (phr) | COI | Smoke (D$_m$) | CO (ppm) |
|---|---|---|---|---|---|
| 2 | 8 | 2 | 26.3 | 374 | 661 |
| 3 | 6 | 4 | 26.6 | 365 | 720 |
| 4 | 4 | 6 | 28.3 | 378 | 780 |
| 5 | 2 | 8 | 28.5 | 355 | 820 |
| 6 | — | 10 | 28.8 | 391 | 857 |

EXAMPLE 3

Eight samples of Nylon 66 were prepared and tested for their fire-retardant properties and their strength. The composition of these samples and the results are given in Table 7.

It can be seen that a substantial proportion of the expensive zinc stannate can be replaced by the cheaper zinc borate with no loss of fire-retardant performance, even though zinc borate on its own exhibited a very poor fire-retardant effect.

EXAMPLE 4

It is known that Nylon 6 is more difficult to render fire-retardant than Nylon 66, partially due to its lower melting point of 220° C., as compared with 260° C. for Nylon 66. A number of samples of Nylon 6 were prepared, all of which included 15% by weight of the halogen-containing fire-retardant Dechlorane. Various levels of zinc stannate were tested for strength and in accordance with UL-94, along with combinations with zinc borate. The results are given in Table 8, together with those for formulations containing tin and zinc oxides for comparison. All of the samples were conditioned at 23° C. and a relative humidity of 50% for seven days before testing.

It can be seen that relatively high levels of additives are required to reach UL-94 V-0 at 0.8 mm or less, but that the combination of zinc stannate and zinc borate demonstrates an improved result.

EXAMPLE 5

A number of different stannates were tested with rigid PVC using samples having the composition:
100 phr PVC Hydro Polymers VY110/51
2 phr Calcium stearate
2 phr TI7M, Tin stabilizer, Ciba Geigy
5 phr Flame Retardant (as specified).

300 g batches of the samples were made up by compounding at 150° C. in a two roll mill, and their COI's were measured using samples compression moulded to 2 mm and cut into 1 cm thick strips. The results are as follows:

| Fire Retardant | COI |
|---|---|
| Zinc hydroxystannate | 67.5 |
| Calcium hydroxystannate | 57.3 |
| Magnesium hydroxystannate | 60.5 |
| Zinc borate ZB2335 | 55.5 |
| Zinc borate ZB223 | 67.0 |
| Zinc Hydroxystannate/ZB2335 | 66.6 (5.0) |
| Calcium hydroxystannate/ZB2335 | 64.6 (8.2) |
| Magnesium hydroxystannate/ZB2335 | 66.4 (8.4) |
| Zinc hydroxystannate/ZB2335 | 66.6 (5.0) |
| Zinc hydroxystannate/ZB223 | 72.4 (5.3) |

ZB223 is a borate of the formula 2ZnO$_2$.2 B$_2$O$_3$.3H$_2$O.

All of the blends are 50–50 by weight, and the figures in brackets are the amounts by which the blends' COI's are greater than would be predicted by simple averaging of the two components.

The results show that the two zinc borates are effective fire retardants and give the same synergistic effect with zinc stannate, and that calcium and magnesium hydroxystannates also give a synergistic effect that is if anything larger than that of the zinc compound.

Magnesium hydroxystannate performed better in the tests as a smoke suppressant for rigid PVC than the other stannates tested.

TABLE 7

| FORMULATION - WEIGHT % | | | | | | | | |
|---|---|---|---|---|---|---|---|---|
| Nylon 66 | 100 | 77.5 | 80 | 80 | 82 | 82 | 82 | 82 |
| Dechlorane | — | 15 | 15 | 15 | 12 | 12 | 12 | 12 |
| Zinc Stannate | — | 7.5 | 5 | 3 | 6 | 4 | 2 | — |
| ZB2235 | — | — | — | 2 | — | 2 | 4 | 6 |
| UL-94 | | | | | | | | |
| 3.0 mm | V-2 | V-0 | V-0 | V-0 | V-0 | V-0 | V-0 | V-0 |
| 1.5 mm | V-2 | V-0 | V-0 | V-0 | V-0 | V-0 | V-0 | Fail |
| 0.75 mm | V-2 | V-0 | V-0 | V-0 | V-1 | V-1 | V-0 | Fail |
| Notched Izod Impact Strength (J/m) | 135 | 69 | 88 | 83 | 84 | 91 | 83 | — |
| Tensile Strength (N/mm$^2$) | 70 | 66 | 74 | 73 | 71 | 73 | 72 | — |

Materials
Nylon 66 A25—BIP
Dechlorane Plus 25—Occidental Chemical Corp.

TABLE 8

| | UL-94 Rating | | | Tensile Strength Nmm$^{-2}$ | Notched Izod Impact Strength J/M |
|---|---|---|---|---|---|
| | 3 mm | 1.5 mm | 0.75 mm | | |
| 7% Zinc stannate | V-0 | V-1 | Fail | 58 | 110 |
| 6% Zinc stannate | V-0 | Fail | Fail | 58 | 114 |
| 5% Zinc stannate | V-1 | Fail | Fail | 58 | 112 |
| 4% Zinc stannate | Fail | Fail | Fail | 58 | 123 |
| 4% Zinc stannate + 2% Zinc borate | V-0 | V-0 | V-1 | 57 | 127 |
| 3% Zinc stannate + 3% Zinc borate | V-0 | Fail | Fail | 56 | 124 |
| 2% Zinc stannate + 4% Zinc borate | V-1 | Fail | Fail | 57 | 127 |
| 6% Zinc borate | Fail | Fail | Fail | 57 | 119 |
| 6% SnO$_2$ | V-0 | V-1 | Fail | 57 | 122 |
| 4% SnO$_2$ + 2% ZnO | Fail | Fail | Fail | 56 | 150 |
| 6% ZnO | Fail | Fail | Fail | 55 | 133 |
| 6% Sb$_2$O$_3$ | Fail | Fail | Fail | 56 | 116 |
| Unfilled Nylon 6 | Fail | Fail | Fail | 65 | 267 |

I claim:

1. A fire-retardant polymer composition comprising a polymer, a source of halogen and a zinc borate, characterised in that the composition includes a divalent metal stannate, the mixture of the zinc borate and divalent metal stannate being in a fire-retardant amount.

2. A composition as claimed in claim 1 wherein the stannate is zinc stannate.

3. A composition as claimed in claim 1 or claim 2 wherein the source of halogen is the polymer itself.

4. A composition as claimed in claim 3 wherein the polymer is polyvinylchloride.

5. A composition as claimed in claim 1 or claim 2 wherein the source of halogen is an organic halogen-containing fire-retardant which is compatible with the polymer.

6. A composition as claimed in claim 5 wherein the polymer is a polyamide.

7. A composition as claimed in claim 6 containing from 40 to 94% by weight of polyamide, from 5 to 40% by weight of a halogen-containing organic fire-retardant which is compatible with the polyamide, and from 1 to 20% by weight of a mixture of zinc borate and zinc stannate.

8. A composition as claimed in any one of the preceding claims wherein the zinc borate and the stannate are present in the composition in approximately the same amounts by weight.

* * * * *